F. W. McGINN.
MUD LUG FOR AUTOMOBILE WHEELS.
APPLICATION FILED OCT. 20, 1920. RENEWED SEPT. 3, 1921.
1,393,450. Patented Oct. 11, 1921.
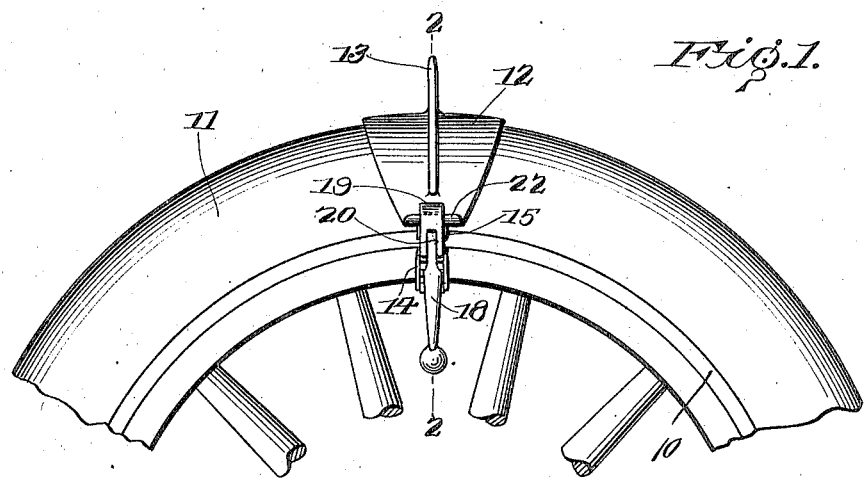
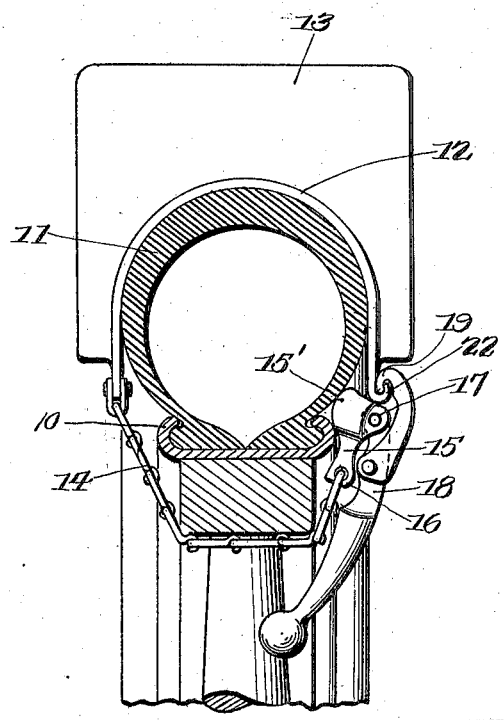
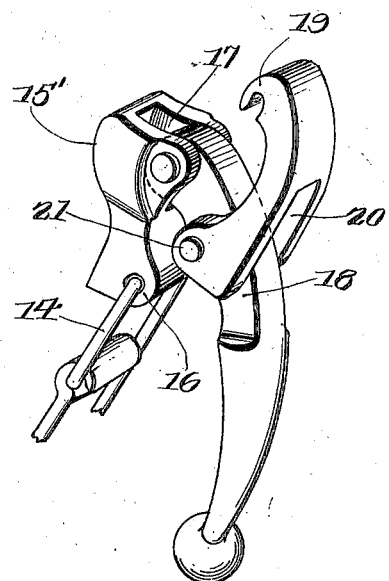
INVENTOR.
F. W. McGinn.
BY
Chandlee & Chandlee
ATTORNEYS.
Witness.
James F. FitzGibbon

UNITED STATES PATENT OFFICE.

FRANCIS W. McGINN, OF BALTIMORE, MARYLAND.

MUD-LUGS FOR AUTOMOBILE-WHEELS.

1,393,450.   Specification of Letters Patent.   Patented Oct. 11, 1921.

Application filed October 20, 1920, Serial No. 418,144. Renewed September 3, 1921. Serial No. 498,535.

*To all whom it may concern:*

Be it known that I, FRANCIS W. McGINN, a citizen of the United States, residing in the city of Baltimore, State of Maryland, have invented certain new and useful Improvements in Mud-Lugs for Automobile-Wheels; and I do hereby declare the following to be a full, clear, and exact description of the invention, such as will enable others skilled in the art to which it appertains to make and use the same.

This invention relates to new and useful improvements in traction devices for automobile wheels, and particularly to mud lugs therefor.

One object of the invention is to provide a locking device for one end of the chain, which is carried by a lug, which cannot be accidentally released by external pressure, but which requires the proper operation of the lever to open the lock.

It is a further object of the invention to provide a mud lug that will not only be efficient in use but which as an article of manufacture, may be produced economically as by drop forging and which will effectually withstand the excessive strains to which an article of this kind is ordinarily subjected.

Other objects and advantages will be apparent from the following description when taken in connection with the accompanying drawing.

In the drawing:

Figure 1 is a side elevation of a mud lug made in accordance with the invention, and shown in connection with a portion of an automobile wheel.

Fig. 2 is a vertical transverse sectional view through the wheel and tire, on the line 2—2 of Fig. 1, showing the lug and locking means in elevation.

Fig. 3 is a perspective view of the locking device.

Referring particularly to the accompanying drawing, 10 represents the rim of a wheel, on which is secured the tire 11, and in connection with which the improved mud lug is used.

The lug includes a base plate 12 which is transversely and longitudinally arched to snugly fit on the tread surface of the tire 11, and formed integrally on the convex face of the plate, and extending transversely of the plate, is an outwardly projecting flange 13, the side portions of which extend outwardly from the base plate at opposite sides of the wheel.

Pivotally connected to one end of the base plate is a length of chain 14, and pivotally connected to the other end of the chain is a metal block 15, one end of which is bifurcated, as shown at 17. Through the other end 16 of the block is pivotally engaged the link at one end of the chain 14 while within the bifurcation referred to, is pivotally mounted one end of the locking lever 18. A hook 19, which is bifurcated at 20, is disposed in straddling relation to the lever and is pivotally connected thereto at 21. The other end of the arched base plate 12 is bent outwardly and upon itself in the formation of a hook 22 to detachably receive the securing hook 19.

The parts 15, 18, and 19 are so connected together that when the lever is swung on its pivot into the position shown in the sectional view Fig. 2, said lever will snap past the center of the pivotal movement thereof and thus draw the adjacent end of the chain, and the hook 19, toward each other, and place the chain 14 under tension.

Under ordinary circumstances an inward pressure on the hook 19 and the connections with the block 15, and the lever 18, would cause the breaking of the position of the parts and permit the lever to swing outwardly and thus release the hook 19 and the chain 14. To prevent this, and thus produce a device which will resist all such accidental displacement of the lock, the block 15 is formed with an inwardly projecting nose 15′ which, when the lock is in operative or engaged position, will bear against the side of the tire adjacent the rim, as shown in the drawing, or directly with the side of the rim, as the case may be in accordance with the style or size of the rim with which the device is used.

It will be understood from the foregoing and readily recognized that the lug itself may be economically made, as it is capable of manufacture by drop forging, while in use it has extreme durability. Furthermore, the attaching means is in the plane of the flange 13 and is so constructed that the arched plate 12 is held securely against rocking through the medium of a single attaching or securing chain.

What is claimed is:

A locking means for the mud lug of an automobile wheel comprising a flexible element connected with the lug, a block pivotally connected with the flexible element, a lever pivotally connected with the block, and a hook pivotally connected with the lever and engageable with the lug, said block being formed with a nose for engagement with a portion of the wheel to prevent inward pivotal movement of the parts when inward pressure is exerted against the said parts.

In testimony whereof I affix my signature in the presence of two witnesses.

FRANCIS W. McGINN.

Witnesses:
JAMES A. SOPER,
W. M. V. STONELL.